(12) United States Patent
Barba et al.

(10) Patent No.: US 11,556,138 B2
(45) Date of Patent: Jan. 17, 2023

(54) PILOTING ASSISTANCE METHOD FOR AN AIRCRAFT, MAKING IT POSSIBLE TO ENSURE THE AVAILABILITY OF AN AUTOMATIC PILOT

(71) Applicant: Airbus Operations S.A.S., Toulouse (FR)

(72) Inventors: Matthieu Barba, La Salvetat (FR); Maxime Semat, Toulouse (FR); Florent Lanterna, Beauzelle (FR)

(73) Assignee: Airbus Operations S.A.S.

( * ) Notice: Subject to any disclaimer, the term of this patent is extended or adjusted under 35 U.S.C. 154(b) by 1079 days.

(21) Appl. No.: 16/209,298

(22) Filed: Dec. 4, 2018

(65) Prior Publication Data

US 2019/0196508 A1 Jun. 27, 2019

(30) Foreign Application Priority Data

Dec. 21, 2017 (FR) ..................................... 17 62842

(51) Int. Cl.
*G05D 1/06* (2006.01)
*G01P 5/02* (2006.01)
(Continued)

(52) U.S. Cl.
CPC ......... *G05D 1/0638* (2013.01); *B64C 13/503* (2013.01); *G01P 5/02* (2013.01); *G05D 1/0077* (2013.01); *G05D 1/0607* (2013.01)

(58) Field of Classification Search
CPC .. G05D 1/0638; G05D 1/0077; G05D 1/0607; B64C 13/503; G01P 5/02
See application file for complete search history.

(56) References Cited

U.S. PATENT DOCUMENTS 6,085,127 A 7/2000 Vos
9,128,109 B1 9/2015 O'Neill
(Continued)

FOREIGN PATENT DOCUMENTS

EP 0 253 614 A2 1/1988
ES 2540970 T3 * 7/2015 ............... B64C 3/10
(Continued)

OTHER PUBLICATIONS

English Translation of FR-2960659-A1.*
(Continued)

*Primary Examiner* — Anshul Sood
*Assistant Examiner* — Matthew Ho
(74) *Attorney, Agent, or Firm* — Lerner, David, Littenberg, Krumholz & Mentlik, LLP

(57) ABSTRACT

A piloting assistance system for an aircraft includes a measuring module for measuring a vertical manoeuvre of the aircraft, a computational module for computing a first load factor from the measured vertical manoeuvre and from a setpoint vertical manoeuvre, a measuring module for measuring an inclination angle, a pitch rate and a pitch acceleration, a protection module including a computational submodule configured to compute a second load factor and a comparison submodule in order to compare the first and the second load factor in order to determine an applicable load factor equal to the minimum between the first and the second load factor, a computational module configured to compute elevator control from the applicable load factor and a sending module configured to send the elevator control to the automatic pilot.

13 Claims, 1 Drawing Sheet

(51) Int. Cl.
*G05D 1/00* (2006.01)
*B64C 13/50* (2006.01)

(56) References Cited

U.S. PATENT DOCUMENTS

| | | | |
|---|---|---|---|
| 2008/0195264 A1* | 8/2008 | Deker | G05D 1/0204 |
| | | | 701/7 |
| 2009/0314900 A1* | 12/2009 | Puig | G05D 1/0623 |
| | | | 244/76 C |
| 2011/0264308 A1 | 10/2011 | Perrie et al. | |
| 2011/0290947 A1 | 12/2011 | Bourret et al. | |
| 2012/0146816 A1 | 6/2012 | Bourret et al. | |
| 2013/0079958 A1 | 3/2013 | Neri et al. | |
| 2014/0107873 A1* | 4/2014 | Moune | G05D 1/0072 |
| | | | 701/16 |
| 2017/0008613 A1* | 1/2017 | Turpin | G05D 1/0808 |
| 2018/0141640 A1* | 5/2018 | Geiger | B64C 13/04 |
| 2018/0180444 A1* | 6/2018 | Cantaloube | G08G 5/0021 |

FOREIGN PATENT DOCUMENTS

| | | | | |
|---|---|---|---|---|
| FR | 1 140 888 A | | 8/1957 | |
| FR | 2 960 659 A1 | | 12/2011 | |
| FR | 2960659 A1 | * | 12/2011 | ........... G05D 1/0077 |

OTHER PUBLICATIONS

English Translation of ES-2540970-T3.*
"Categories of the ILS" AVweb published Nov. 2014 to Garrison https://www.avweb.com/flight-safety/technique/catergios-of-the-ils; 2014.

* cited by examiner

PILOTING ASSISTANCE METHOD FOR AN AIRCRAFT, MAKING IT POSSIBLE TO ENSURE THE AVAILABILITY OF AN AUTOMATIC PILOT

FIELD OF THE INVENTION

The present invention relates to an automatic method and system for assisting with the piloting of an aircraft in order to control at least an automatic pilot of the aircraft when no anemometric data and no anemometric estimator is available.

BACKGROUND OF THE INVENTION

Within the context of the present description, an automatic pilot corresponds:
either to an automatic piloting system which acts automatically upon the control surfaces of the aircraft for the guidance of the latter,
or to a flight director which automatically displays information on a screen of the cockpit of the aircraft in order to provide assistance for the manual piloting carried out by the pilot of the aircraft.

It is known that the automatic pilot of an aircraft, when it is optionally coupled to a thrust regulating device, uses forward speed information of the aircraft, for example an airspeed, with the aim of holding a selection of the pilot and/or the speed range at values that are acceptable for the aircraft. If, in the course of piloting, this speed information is lost, i.e. if it becomes unavailable, incorrect, or unreliable, the automatic pilot and/or the thrust regulating device disengages automatically while holding the current state of the aircraft (attitude and thrust), and returns control to the crew. Such a situation can occur, in particular, in the case of common mode of failures due, for example, to severe or poor environmental conditions. This situation is, however, exceptional, since the majority of aircraft are equipped with systems for limiting the effects of said environmental conditions, such as to improve the availability of the speed information. Disengaging the automatic pilot and/or the thrust regulating device causes an additional workload for the crew who must deal with the cause of the failure in addition to the normal tasks, while in an unusual situation in which the speed information is lost. The forward speed information is a primary parameter, used by the automatic piloting system or the flight director, in order to define the flight envelope of the aircraft (upper and lower limits) and the dynamics of the aircraft. An automatic pilot or a thrust regulating device which would not respect these speed limits could cause the aircraft to depart from the flight envelope thereof. For this reason, the automatic pilot and the thrust regulating device are provided with various normal means which protect the speed range.

The document FR 2 960 659 A1 proposes a solution which is not entirely satisfactory. Indeed, it does not make it possible to obtain a flight that is stabilized over the entire flight envelope without adding thereto additional mechanisms beyond an attitude limit.

BRIEF SUMMARY OF THE INVENTION

Aspects of the present invention may overcome these disadvantages by proposing a piloting assistance method for an aircraft, making it possible to ensure the availability of at least an automatic pilot and/or of a thrust regulation device without air data or data from an air data estimator being available or necessary.

An aspect of the invention relates to a piloting assistance method for an aircraft, making it possible to ensure the availability of at least an automatic pilot that can be controlled without forward speed information for the aircraft.

According to an aspect of the invention, the method comprises:
a first measuring step, implemented by a first measuring module, including measuring a vertical manoeuvre of the aircraft;
a first computational step, implemented by a first computational module, including computing a first load factor from the measured vertical manoeuvre and from a setpoint vertical manoeuvre;
a second measuring step, implemented by a second measuring module, including measuring an inclination angle, a pitch rate and a pitch acceleration of the aircraft;
a protection step, implemented by a protection module, including:
  a computational substep, implemented by a computational submodule, including computing a second load factor from the measured inclination angle, from the measured pitch rate and from the measured pitch acceleration,
  a comparison substep, implemented by a comparison submodule, including comparing the first load factor with the second load factor in order to determine an applicable load factor equal to the load factor having the smallest value between the first load factor and the second load factor;
a second computational step, implemented by a second computational module, including computing elevator control from the applicable load factor;
a first sending step, implemented by a first sending module, including sending the elevator control computed in the second computational step to the automatic pilot.

Thus, the automatic pilot has an increased availability such as to maintain continuous cruising flight and to propose a satisfactory level of automatic operation in a deteriorated situation when forward speed information is not available.

According to a characteristic feature, the vertical manoeuvre corresponds to a vertical speed of the aircraft or a gradient of the aircraft.

Advantageously, the protection step further comprises a substep for reducing the nose-up pitch dynamics, implemented by a reducing submodule, including reducing the nose-up pitch dynamics, as the measured inclination angle approaches a maximum inclination angle such that the measured inclination angle remains below the maximum inclination angle.

According to a preferred embodiment, the method further comprises:
a third computational step, implemented by a third computational module, including computing a static term for thrust control making it possible to reach an equilibrium point of the aircraft, the static term depending on a current flight level of the aircraft, a mass of the aircraft and the number of engines operating on the aircraft;
a fourth computational step, implemented by a fourth computational module, including computing a dynamic term for the thrust control making it possible to maintain the equilibrium point of the aircraft from the inclination angle measurement;

a fifth computational step, implemented by a fifth computational module, including computing thrust control as the sum of the static term and of the dynamic term;

a second sending step, implemented by a second sending module, including sending the thrust control to a thrust regulation device.

According to a characteristic feature, the fourth computational step includes computing the dynamic term for the thrust control in the following manner:

when the measured inclination angle is above an inclination angle of the equilibrium point, the dynamic term for the thrust control has a positive value;

when the measured inclination angle is below the inclination angle of the equilibrium point, the dynamic term for the thrust control has a negative value;

the further the measured inclination angle is from the inclination angle of the equilibrium point, the greater the absolute value of the dynamic term for the thrust control is;

the dynamic term for the thrust control is between a maximum threshold and a minimum threshold.

For example, the equilibrium point corresponds to a configuration of the aircraft having a speed corresponding to a recommended "turbulent air" speed or a recommended "turbulent air" Mach number for entering a turbulent zone.

Furthermore, the attenuated inclination angle is used in the fourth computational step in order to compute the dynamic term for the thrust control.

Furthermore, the attenuated inclination angle corresponds to a configuration of the aircraft having a speed with a lift/drag ratio greater than a predetermined value.

Moreover, the automatic pilot comprises an automatic piloting system and a flight director, the method further comprising a control step, implemented by a controlling module, including controlling the thrust regulation device, the automatic piloting system and the flight director at least in the following manner:

if the thrust regulation device is activated by a pilot of the aircraft, an activation command is sent to the flight director in order to activate the flight director;

if the automatic piloting system and the flight director are deactivated, a deactivation command is sent to the thrust regulation device in order to deactivate the thrust regulation device.

The invention also relates to a piloting assistance system for an aircraft, making it possible to ensure the availability of at least an automatic pilot which can be controlled without forward speed information for the aircraft.

According to an embodiment of the invention, the system comprises:

a first measuring module configured to measure a vertical manoeuvre of the aircraft;

a first computational module configured to compute a first load factor from the measured vertical manoeuvre and from a setpoint vertical manoeuvre;

a second measuring module configured to measure an inclination angle, a pitch rate and a pitch acceleration of the aircraft;

a protection module including:

a computational submodule configured to compute a second load factor from the measured inclination angle, from the measured pitch rate and from the measured pitch acceleration, a comparison submodule configured to compare the first load factor with the second load factor in order to determine an applicable load factor equal to the load factor having the smallest value between the first load factor and the second load factor;

a second computational module configured to compute elevator control from the applicable load factor;

a first sending module configured to send the elevator control computed by the second computational module to the automatic pilot.

Advantageously, the protection module further comprises a reducing submodule configured to reduce the nose-up pitch dynamics, as the measured inclination angle approaches a maximum inclination angle such that the measured inclination angle remains below the maximum inclination angle.

According to an embodiment, the system further comprises:

a third computational module configured to compute a static term for thrust control making it possible to reach an equilibrium point of the aircraft, the static term depending on a current flight level of the aircraft, a mass of the aircraft and the number of engines operating on the aircraft;

a fourth computational module configured to compute a dynamic term for the thrust control making it possible to maintain the equilibrium point of the aircraft from the inclination angle measurement;

a fifth computational module configured to compute thrust control as the sum of the static term and of the dynamic term;

a second sending module configured to send the thrust control to a thrust regulation device.

Furthermore, the automatic pilot comprises an automatic piloting system and a flight director, the system further comprising a controlling module configured to control the thrust regulation device, the automatic piloting system and the flight director at least in the following manner:

if the thrust regulation device is activated by a pilot of the aircraft, the controlling module sends an activation command to the flight director in order to activate the flight director;

if the automatic piloting system and the flight director are deactivated, the controlling module sends a deactivation command to the thrust regulation device in order to deactivate the thrust regulation device.

The invention also relates to an aircraft, in particular a transport plane, including a piloting assistance system as described above.

BRIEF DESCRIPTION OF THE DRAWINGS

The invention and the features and advantages thereof will emerge more clearly upon reading the description given with reference to the appended drawings wherein.

DETAILED DESCRIPTION

Figure 1:
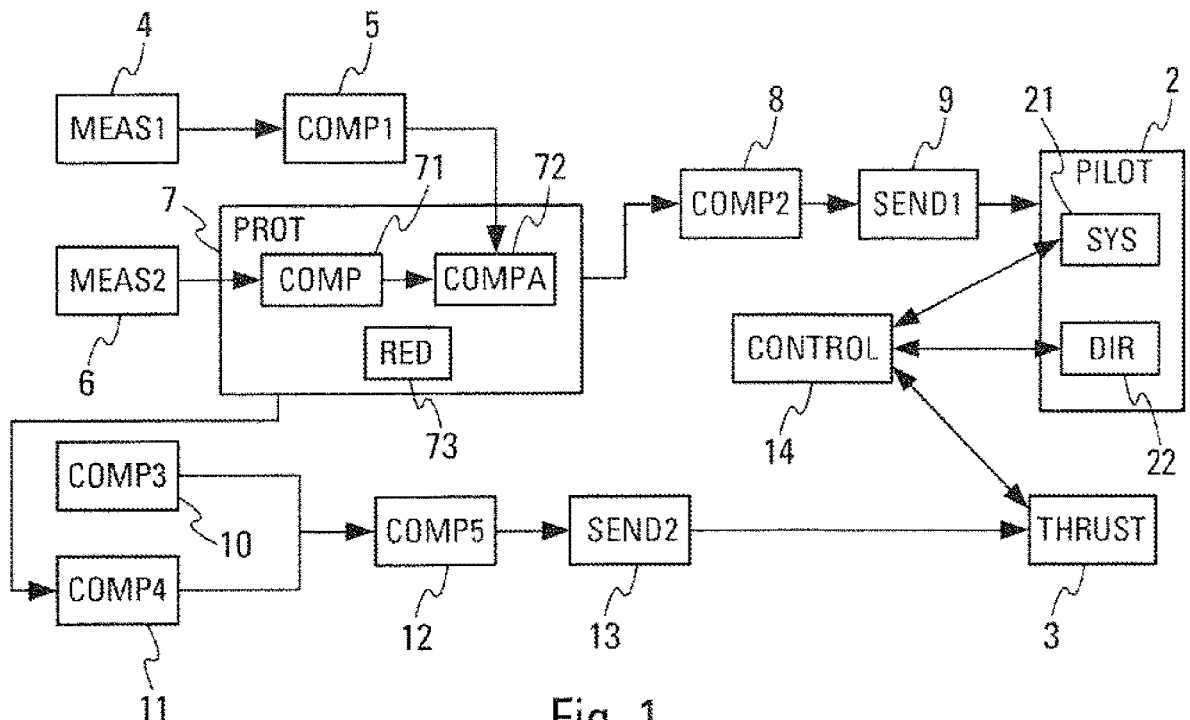
FIG. 1 schematically shows the piloting assistance system.
Figure 3:
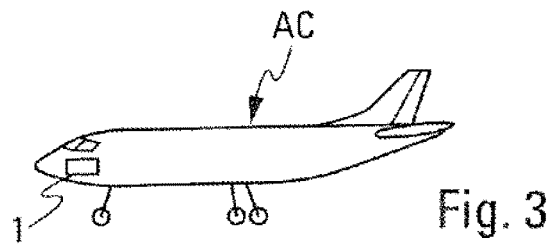
FIG. 3 shows an aircraft carrying the piloting assistance system on-board.

FIG. 1 schematically shows an embodiment of a piloting assistance system 1 on board an aircraft AC (FIG. 3).

The piloting assistance system 1 makes it possible to ensure the availability of at least an automatic pilot PILOT (PILOT for "automatic pilot" in English) 2 and/or of a thrust regulation device THRUST (THRUST for "thrust regulation device" in English) 3 which can be controlled without forward speed information, i.e. without air data or data from an air data estimator making it possible to determine a forward speed (for example an air speed) being available.

The automatic pilot 2 comprises an automatic piloting system SYS (SYS for "automatic piloting system" in English) 21 and/or a flight director DIR (DIR for "flight director" in English) 22.

The piloting assistance system 1 comprises a measuring module MEAS1 (MEAS for "measuring module" in English) 4 configured to measure a vertical manoeuvre of the aircraft AC.

According to a first alternative embodiment, the measuring module 4 comprises an inertial unit.

According to a second alternative embodiment, the measuring module 4 comprises a satellite geo-navigation system such as a global positioning system (GPS for "Global Positioning System" in English).

According to a third alternative, the measuring module 4 comprises a satellite geo-navigation system and an inertial unit.

The piloting assistance system further comprises a computational module COMP1 (COMP for "computational module" in English) 5, configured to compute a first load factor from the vertical manoeuvre measured by the measuring module 4 and from a setpoint vertical manoeuvre. The setpoint vertical manoeuvre can correspond to a vertical manoeuvre chosen by the pilot of the aircraft AC. The first load factor corresponds to a vertical load factor.

Moreover, the piloting assistance system 1 comprises a measuring module MEAS2 6 configured to measure an inclination angle of the aircraft AC, a pitch rate of the aircraft AC and a pitch acceleration of the aircraft AC.

The piloting assistance system 1 also comprises a protection module PROT (PROT for "protection module" in English) 7 including:

a computational submodule COMP 71 configured to compute a second load factor from the inclination angle measured by the measuring module 6, from the measured pitch rate and from the measured pitch acceleration. The second load factor corresponds to a vertical load factor;

a comparison submodule COMPA (COMPA for "comparison submodule" in English) 72 configured to compare the first load factor computed by the computational module 5 with the second load factor computed by the computational submodule 7 in order to determine an applicable load factor equal to the load factor having the smallest value between the first load factor and the second load factor.

The comparison submodule 72 therefore determines the minimum between the first load factor and the second load factor. The applicable load factor therefore corresponds to the minimum of the two load factors or, in other words, the most pitch-down load factor.

According to a preferred embodiment, the protection module 7 comprises a reducing submodule RED (RED for "reducing submodule" in English) 73 configured to reduce the nose-up pitch dynamics as the measured inclination angle approaches a maximum inclination angle such that the measured inclination angle remains below the maximum inclination angle.

By way of example, the maximum inclination angle corresponds to a configuration of the aircraft AC having a speed with a lift/drag ratio greater than a predetermined value or otherwise called "green dot" speed. The predetermined value can be chosen such that this lift/drag ratio has the greatest value.

The piloting assistance system further comprises a computational module COMP2 8 configured to compute elevator control (or pitch control in order to automatically control the elevators) from the applicable load factor determined by the comparison submodule 72.

The elevator control computed by the computational module 8 is then sent to the automatic pilot 2 by a sending module SEND1 (SEND for "sending module" in English) 9 included in the piloting assistance system 1.

This elevator control makes it possible to implement automatic control in vertical manoeuvre of the aircraft AC.

The vertical manoeuvre can correspond to a vertical speed or a gradient.

If the automatic pilot 2 operates, for example, in a guidance mode of the aircraft AC corresponding to a HDG lateral guidance mode called "heading", the vertical manoeuvre corresponds to the vertical speed. Automatic control corresponds to an automatic vertical speed control.

If the automatic pilot 2 operates, for example in a guidance mode of the aircraft AC corresponding to a TRK guidance mode called "track", the vertical manoeuvre corresponds to a gradient. The automatic control is therefore an automatic gradient control.

The TRK lateral guidance mode is associated with the FPA vertical guidance mode called "flight path angle", which makes it possible to use the velocity vector (or otherwise called "inertial bird") shown on a primary flight display (PFD for "Primary Flight Display" in English) of the aircraft AC.

Advantageously, the piloting assistance system 1 also makes it possible to implement automatic thrust control.

Thus, the piloting assistance system 1 can comprise a computational model COMP3 10 configured to compute a static term for thrust control making it possible to reach an equilibrium point of the aircraft AC. The static term is dependent upon a current flight level of the aircraft AC, a mass of the aircraft AC and the number of engines operating on the aircraft AC.

By way of example, the static term corresponds to the controlled rotation speed of the blades of the engines of the aircraft AC. According to other examples, the static term can be a pressure ratio or a power.

Furthermore, the piloting assistance system 1 can comprise a computational module COMP4 11 configured to compute a dynamic term for the thrust control making it possible to maintain the equilibrium point of the aircraft AC from the inclination angle measurement.

The measured inclination angle determined by the protection module 7 can be used to compute the dynamic term for the thrust control.

Advantageously, the computational module 11 is configured to compute the dynamic term for the thrust control in the following manner:

when the measured inclination angle is above an inclination angle of the equilibrium point, the dynamic term for the thrust control has a positive value;

when the measured inclination angle is below the inclination angle of the equilibrium point, the dynamic term for the thrust control has a negative value;

the further the measured inclination angle is from the inclination angle of the equilibrium point, the greater the absolute value of the dynamic term for the thrust control is;

the dynamic term for the thrust control is between a maximum threshold and a minimum threshold.

When the measured inclination angle is substantially equal to the attitude of the equilibrium point, the dynamic term for the thrust control is substantially zero.

Thrust control can then be computed by a computational module COMP5 12 contained in the piloting assistance system 1. The computational module 12 computes the thrust control as the sum of the static term computed by the computational module 10 and of the dynamic term computed by the computational module 11.

The thrust control computed in this manner by the computational module 12 can then be sent to the thrust regulation device 3 by a sending module SEND2 13 included in the piloting assistance system 1.

By way of example, the equilibrium point corresponds to a configuration of the aircraft AC having a recommended "turbulent air" speed or a recommended "turbulent air" Mach number for entering a turbulent zone ($V_{RA}/M_{RA}$).

According to a preferred embodiment, the piloting assistance system 1 also comprises a controlling module CONTROL (CONTROL for "controlling module" in English) 14 configured to control the thrust regulation device 3. The automatic piloting system 21 and the flight director 22 are controlled by the controlling module 14 at least in the following manner:

if the thrust regulation device 3 is activated by a pilot of the aircraft AC, an activation command is sent to the flight director 22 in order to activate the flight director 22;

if the automatic piloting system 21 and the flight director 22 are deactivated, a deactivation command is sent to the thrust regulation device 3 in order to deactivate the thrust regulation device 3.

Automatic thrust control is not compulsory. The piloting assistance system 1 retains the ability to activate the vertical manoeuvre automatic control without the thrust regulation device 3, whether it is deactivated by the pilot or has failed. In this case, the pilot manually adjusts the position of the throttle control levers in order to define the thrust level. The low speed protection and the associated warning informs the crew of departure from the vertical manoeuvre (or gradient) setpoint if the thrust level is insufficient.

The controlled thrust can be adjusted in order to counter the effects of engine failure.

The piloting assistance system 1 is based on basic guidance modes, taught and practised by pilots, namely the HDG and TRK lateral guidance modes, the VS ("vertical speed hold" mode) and FPA vertical guidance modes as well as the THR thrust regulation mode. This allows for simplified use thereof and for a reduction in the workload of the crew.

In the case where the piloting assistance device is limited to the zero gradient or vertical speed setpoint hold, the usefulness of the inertial bird is enhanced for providing the level changes, which are then carried out by manual piloting. A device for automatically disconnecting the automatic piloting device 21, flight director 22 and the thrust regulation device 3 can be required to cover the instances where the failures causing the activation of the piloting assistance device 1 arise while:

a collision prevention automatic manoeuvre is underway;

the aircraft AC has a climb attitude. In this situation, in the case of relief, it is preferable to disconnect the automatic operations in order to retain the current climb attitude of the aircraft AC. A specific condition confirming that the aircraft AC is above the highest land geographical point can be advantageously met to prevent this type of disconnection in the cruise flight levels.

The availability of settings for a group of setpoints for vertical speeds or gradients makes it possible to manage the preceding cases without having to disengage the automatic piloting device 21, the flight director 22 and the thrust regulation device 3.

Moreover, it is possible to limit the piloting assistance device 1 to the retracted slats and flaps, and retracted landing gear configurations in order to limit the complexity of the settings, while retaining climb, descent and cruise availability.

Figure 2:
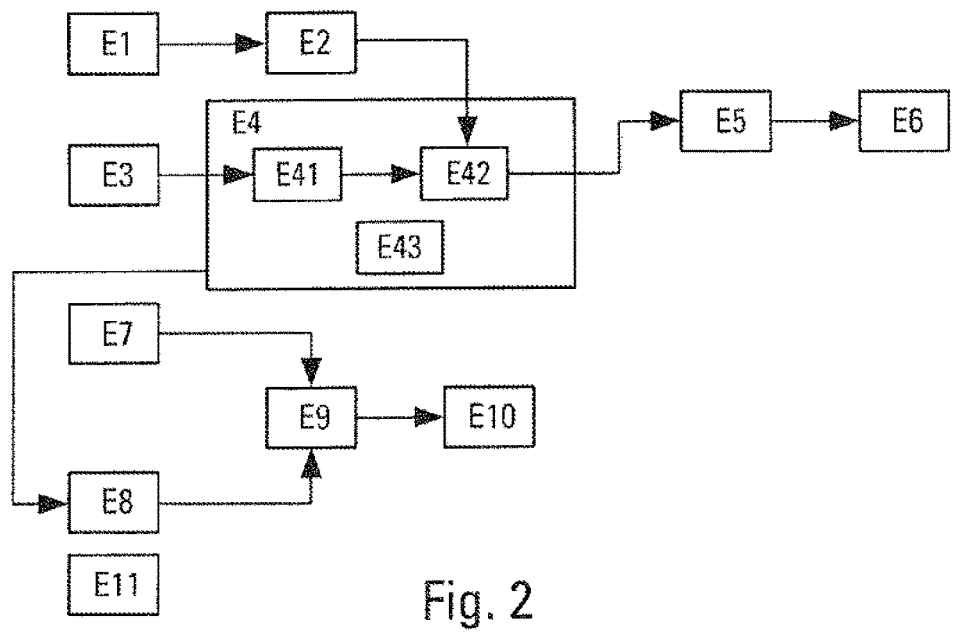
FIG. 2 schematically shows the piloting assistance method.

The invention also relates to a piloting assistance method (FIG. 2).

The piloting assistance method comprises:

a measuring method E1, implemented by the measuring module 4, including measuring a vertical manoeuvre of the aircraft AC;

a computational step E2, implemented by the computational module 5, including computing a first load factor from the measured vertical manoeuvre and from a setpoint vertical manoeuvre;

a measuring step E3, implemented by the measuring module 6, including measuring an inclination angle, a pitch rate and a pitch acceleration;

a protection step E4, implemented by the protection module 7, including:

a computational substep E41, implemented by the computational submodule 71, including computing a second load factor from the measured inclination angle, from the measured pitch rate and the measured pitch acceleration, a comparison substep E42, implemented by the comparison submodule 72, including comparing the first load factor with the second load factor in order to determine an applicable load factor equal to the load factor having the smallest value between the first load factor and the second load factor;

a computational step E5, implemented by the computational module 8, including computing elevator control from the applicable load factor;

a sending step E6, implemented by the sending module 9, including sending the elevator control calculated in the computational step E5 to the automatic pilot 2.

The method can further comprise:

a computational step E7, implemented by the computational module 10, including computing a static term for thrust control making it possible to reach an equilibrium point of the aircraft AC, the static term being dependent upon a current flight level of the aircraft AC, a mass of the aircraft AC and the number of engines operating on the aircraft AC;

a computational step E8, implemented by the computational module 11, including computing a dynamic term for the thrust control for retaining the equilibrium point of the aircraft AC from the inclination angle measurement;

a computational step E9, implemented by the computational module 12, including computing thrust control as the sum of the static term and of the dynamic term;

a sending step E10, implemented by the sending module 13, including sending the thrust control to the thrust regulation device 3.

The method can further comprise a control step E11, implemented by the controlling module 14, including controlling the thrust regulation device 3, the automatic piloting system 21 and the flight director 22 at least in the following manner:

if the thrust regulation device 3 is activated by a pilot of the aircraft AC, an activation command is sent to the flight director 22 in order to activate the flight director 22;

if the automatic piloting system 21 and the flight director 22 are deactivated, a deactivation command is sent to the thrust regulation device 3 in order to deactivate the thrust regulation device 3.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A piloting assistance method for an aircraft, making it possible to ensure the availability of at least an automatic pilot, the method comprising:
   a first measuring step, implemented by a first measuring module, including measuring a vertical manoeuvre of the aircraft;
   a first computational step, implemented by a first computational module, including computing a first load factor from the measured vertical manoeuvre and from a setpoint vertical manoeuvre;
   a second measuring step, implemented by a second measuring module, including measuring an inclination angle, a pitch rate and a pitch acceleration of the aircraft;
   a protection step, implemented by a protection module, including:
      a computational substep, implemented by a computational submodule, including computing a second load factor from the measured inclination angle, from the measured pitch rate and from the measured pitch acceleration,
      a comparison substep, implemented by a comparison submodule, including comparing the first load factor with the second load factor in order to determine an applicable load factor equal to the load factor having the smallest value between the first load factor and the second load factor;
   a second computational step, implemented by a second computational module, including computing elevator control from the applicable load factor;
   a first sending step, implemented by a first sending module, including sending the elevator control computed in the second computational step to the automatic pilot; and
   automatically controlling the vertical manoeuvre of the aircraft based on the elevator control.

2. The method according to claim 1, wherein the vertical manoeuvre corresponds to a vertical speed of the aircraft or a gradient of the aircraft.

3. The method according to claim 1, wherein the protection step further comprises a substep for reducing the nose-up pitch dynamics, implemented by a reducing submodule, including reducing the nose-up pitch dynamics, as the measured inclination angle approaches a maximum inclination angle such that the measured inclination angle remains below the maximum inclination angle.

4. The method according to claim 3, further comprising:
   a third computational step, implemented by a third computational module, including computing a static term for thrust control making it possible to reach an equilibrium point of the aircraft, the static term being dependent on a current flight level of the aircraft, a mass of the aircraft and the number of engines operating on the aircraft;
   a fourth computational step, implemented by a fourth computational module, including computing a dynamic term for the thrust control making it possible to maintain the equilibrium point of the aircraft from the inclination angle measurement;
   a fifth computational step, implemented by a fifth computational module, including computing thrust control as the sum of the static term and of the dynamic term;
   a second sending step, implemented by a second sending module, including sending the thrust control to a thrust regulation device,
   wherein an attenuated inclination angle is used in the fourth computational step in order to compute the dynamic term for the thrust control.

5. The method according to claim 3, wherein the maximum inclination angle corresponds to a configuration of the aircraft having a speed with a lift/drag ratio greater than a predetermined value.

6. The method according to claim 1, further comprising:
   a third computational step, implemented by a third computational module, including computing a static term for thrust control making it possible to reach an equilibrium point of the aircraft, the static term being dependent on a current flight level of the aircraft, a mass of the aircraft and the number of engines operating on the aircraft;
   a fourth computational step, implemented by a fourth computational module, including computing a dynamic term for the thrust control making it possible to maintain the equilibrium point of the aircraft from the inclination angle measurement;
   a fifth computational step, implemented by a fifth computational module, including computing thrust control as the sum of the static term and of the dynamic term;
   a second sending step, implemented by a second sending module, including sending the thrust control to a thrust regulation device.

7. The method according to claim 6, wherein the fourth computational step includes computing the dynamic term for the thrust control in the following manner:
   when the measured inclination angle is above an inclination angle of the equilibrium point, the dynamic term for the thrust control has a positive value;
   when the measured inclination angle is below the inclination angle of the equilibrium point, the dynamic term for the thrust control has a negative value;
   the further the measured inclination angle is from the inclination angle of the equilibrium point, the greater the absolute value of the dynamic term for the thrust control is;
   the dynamic term for the thrust control is between a maximum threshold and a minimum threshold.

8. The method according to claim 6, wherein the equilibrium point corresponds to a configuration of the aircraft having a speed corresponding to a recommended "turbulent air" speed or a recommended "turbulent air" Mach number for entering a turbulent zone.

9. The method according to claim 1, wherein the automatic pilot comprises an automatic piloting system and a flight director,
the method further comprising a control step, implemented by a controlling module, including controlling a thrust regulation device, the automatic piloting system and the flight director at least in the following manner:
if the thrust regulation device is activated by a pilot of the aircraft, an activation command is sent to the flight director in order to activate the flight director;
if the automatic piloting system and the flight director are deactivated, a deactivation command is sent to the thrust regulation device in order to deactivate the thrust regulation device.

10. An aircraft comprising a piloting assistance system for an aircraft, making it possible to ensure the availability of at least an automatic pilot, the piloting assistance system comprising:
a plurality of processors;
a first measuring module comprising at least one of the plurality of processors and configured to measure a vertical manoeuvre of the aircraft;
a first computational module comprising at least one of the plurality of processors and configured to compute a first load factor from the measured vertical manoeuvre and from a setpoint vertical manoeuvre;
a second measuring module comprising at least one of the plurality of processors and configured to measure an inclination angle, a pitch rate and a pitch acceleration of the aircraft;
a protection module including:
a computational submodule comprising at least one of the plurality of processors and configured to compute a second load factor from the measured inclination angle, from the measured pitch rate and from the measured pitch acceleration; and
a comparison submodule comprising at least one of the plurality of processors and configured to compare the first load factor with the second load factor in order to determine an applicable load factor equal to the load factor having the smallest value between the first load factor and the second load factor;
a second computational module comprising at least one of the plurality of processors and configured to compute elevator control from the applicable load factor; and
a first sending module comprising at least one of the plurality of processors and configured to send the elevator control computed by the second computational module to the automatic pilot,
wherein the automatic pilot is configured to automatically control the vertical manoeuvre of the aircraft based on the elevator control.

11. The system according to claim 10, wherein the protection module further comprises a reducing submodule comprising at least one of the plurality of processors and configured to reduce the nose-up pitch dynamics, as the measured inclination angle approaches a maximum inclination angle such that the measured inclination angle remains below the maximum inclination angle.

12. The system according to claim 10, further comprising:
a third computational module comprising at least one of the plurality of processors and configured to compute a static term for thrust control making it possible to reach an equilibrium point of the aircraft, the static term depending on a current flight level of the aircraft, a mass of the aircraft and the number of engines operating on the aircraft;
a fourth computational module comprising at least one of the plurality of processors and configured to compute a dynamic term for the thrust control making it possible to maintain the equilibrium point of the aircraft from the inclination angle measurement;
a fifth computational module comprising at least one of the plurality of processors and configured to compute thrust control as the sum of the static term and of the dynamic term; and
a second sending module comprising at least one of the plurality of processors and configured to send the thrust control to a thrust regulation device.

13. The system according to claim 10, wherein the automatic pilot comprises an automatic piloting system and a flight director,
the system further comprising a controlling module comprising at least one of the plurality of processors and configured to control a thrust regulation device, the automatic piloting system and the flight director at least in the following manner:
if the thrust regulation device is activated by a pilot of the aircraft, the controlling module is configured to send an activation command to the flight director in order to activate the flight director;
if the automatic piloting system and the flight director are deactivated, the controlling module is configured to send a deactivation command to the thrust regulation device in order to deactivate the thrust regulation device.

* * * * *